(12) United States Patent
Sakano et al.

(10) Patent No.: US 9,553,306 B2
(45) Date of Patent: Jan. 24, 2017

(54) LITHIUM SECONDARY BATTERY

(75) Inventors: Mitsuru Sakano, Toyota (JP); Hisao Yamashige, Toyota (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 372 days.

(21) Appl. No.: 14/112,791

(22) PCT Filed: Apr. 19, 2011

(86) PCT No.: PCT/JP2011/059665
§ 371 (c)(1),
(2), (4) Date: Oct. 18, 2013

(87) PCT Pub. No.: WO2012/144021
PCT Pub. Date: Oct. 26, 2012

(65) Prior Publication Data
US 2014/0030598 A1    Jan. 30, 2014

(51) Int. Cl.
*H01M 4/36* (2006.01)
*H01M 4/485* (2010.01)
*H01M 4/62* (2006.01)
*H01M 4/505* (2010.01)
*H01M 4/525* (2010.01)

(52) U.S. Cl.
CPC ............ *H01M 4/366* (2013.01); *H01M 4/485* (2013.01); *H01M 4/626* (2013.01); *H01M 4/505* (2013.01); *H01M 4/525* (2013.01); *H01M 2220/20* (2013.01); *Y02E 60/122* (2013.01)

(58) Field of Classification Search
CPC .................................................. H01M 4/366
See application file for complete search history.

(56) References Cited

U.S. PATENT DOCUMENTS

2008/0295879 A1* 12/2008 Atanackovic ........... H01L 35/22
136/238

FOREIGN PATENT DOCUMENTS

| CN | 101521278 | | 9/2009 |
|----|-----------|---|--------|
| CN | 101521278 A | * | 9/2009 |
| JP | 10-144299 | | 5/1996 |
| JP | 10-144291 | | 5/1998 |
| JP | 2004-200101 | | 7/2004 |
| JP | 2009-076278 | | 4/2009 |
| JP | 2011-070789 | | 4/2011 |

OTHER PUBLICATIONS

Translation of CN 101521278.*

* cited by examiner

*Primary Examiner* — Ula C Ruddock
*Assistant Examiner* — Gregory Passa
(74) *Attorney, Agent, or Firm* — Finnegan, Henderson, Farabow, Garrett & Dunner, LLP

(57) ABSTRACT

The present invention provides a lithium secondary battery having reduced internal resistance. The lithium secondary battery comprises a positive electrode, a negative electrode, and a non-aqueous electrolyte. The positive electrode comprises, as a positive electrode active material 30, a lithium transition metal composite oxide having a layered structure. In a surface region 82A of a positive electrode active material particle 82, at least one species among elements belonging to groups 3 to 7 of the periodic table is supplemented by ion implantation.

5 Claims, 5 Drawing Sheets

LITHIUM SECONDARY BATTERY

CROSS-REFERENCE TO RELATED APPLICATIONS

This application is a national phase application of International Application No. PCT/JP2011/059665, filed Apr. 19, 2011, the content of which is incorporated herein by reference.

TECHNICAL FIELD

The present invention relates to a lithium secondary battery using a lithium transition metal composite oxide having a layered structure as a positive electrode active material.

BACKGROUND ART

Lithium secondary batteries are becoming more and more important as power supplies loaded on vehicles or power sources for PCs, mobile devices, and so on. In particular, lithium-ion secondary batteries, which are lightweight, yet provide high energy densities, are expected as preferable high-power power supplies loaded on vehicles. A typical example of a positive electrode active material used in lithium secondary batteries is a composite oxide containing lithium and a transition metal while having a layered stricture. Technical literature relating to lithium secondary batteries includes Patent Documents 1 to 3.

CITATION LIST

Patent Literature

[Patent Document 1] Japanese Patent Application Publication No. 2004-200101
[Patent Document 2] Japanese Patent Application Publication No. H10-144291
[Patent Document 3] Japanese Patent Application Publication No. H10-144299

SUMMARY OF INVENTION

Technical Problem

With respect to batteries requiring high power such as batteries loaded on vehicles (e.g., vehicle-driving power supplies), etc., it is important to suppress the internal resistance of the batteries to low levels. For example, if the internal resistance of the positive electrode active material can be kept at a lower level, batteries can be obtained with greater output performance. Patent Document 1 discloses a technique where zirconium is co-precipitated in synthesis of a cobalt compound, and the cobalt compound containing the co-precipitated zirconium and a lithium source are mixed and calcined. It describes that, according to such a technique, zirconium is evenly added to the surface of the lithium-containing cobalt composite oxide, and this improves the cycle property of the battery. However, the technique according to Patent Document 1 is not aimed for decreasing the internal resistance; and therefore, simple application of such a technique will not effectively achieve the objective described above. The same is true with Patent Documents 2 and 3.

An objective of the present invention is to provide a lithium secondary battery comprising, as a positive electrode active material, a lithium transition metal composite oxide having a layered structure while having lower internal resistance. Another related objective is to provide a method for producing such an active material for lithium secondary batteries.

Solution to Problem

The present invention provides a lithium secondary battery comprising a positive electrode, a negative electrode, and a non-aqueous electrolyte. The positive electrode comprises, as a positive electrode active material, a lithium transition metal composite oxide having a layered structure. The positive electrode active material comprises surface regions supplemented via ion implantation with at least one species among elements belonging to groups 3 to 7 of the periodic table (referring to the extended periodic table; the same applies hereinafter). A lithium secondary battery having such a constitution may have lower internal resistance, by means of comprising a positive electrode active material that is a lithium transition metal composite oxide comprising surface regions ionically implanted with an element (or "supplemental element" hereinafter) belonging to groups 3 to 7 of the periodic table. By this means, greater high-rate properties (e.g., higher output power, higher discharge capacity at a high rate discharge, etc.) can be achieved.

The term "lithium secondary battery" in the present description refers to a secondary battery that uses lithium ion as an electrolyte ion, with charging and discharging of the battery being achieved by transport of charges carried by lithium ions between the positive and negative electrodes. Batteries generally referred to as lithium-ion secondary batteries are typical examples included in scope of the lithium secondary battery in the present description. The term "active material" in the present description refers to a substance capable of reversely storing and releasing (typically, by allowing intercalation and deintercalation of) a chemical species (i.e., lithium ion herein) to act as a charge carrier in a secondary battery.

The present invention provides a lithium secondary battery comprising a positive electrode that comprises, as a positive electrode active material, a lithium transition metal composite oxide having a layered structure; a negative electrode; and a non-aqueous electrolyte; with the positive electrode active material comprising surface regions supplemented with at least one species among elements belonging to groups 3 to 7 of the periodic table. The positive electrode active material exhibits an absorbance peak at 530 eV in its XAFS (X-ray absorption fine structure) spectrum of the surface region, with the peak having an intensity of 80% to 95% expressed as a relative value to the intensity of the positive electrode active material wherein the surface regions are not supplemented with the element. A lithium secondary battery having such a constitution may produce higher performance by means of comprising a positive electrode active material that comprises surface regions supplemented with the supplemental element and has been modified to have a surface state suitable for reduction of the internal resistance. For example, the battery may exhibit even greater high-rate properties (e.g., higher output power, higher discharge capacity at a high rate discharge, etc.). In the art disclosed herein, the number of the supplemental element supplemented (e.g., ionically implanted) to the surface regions of the active material can be, for instance, $1 \times 10^{15}$ to $10^{17}$ per $cm^2$ of particle surface area of the active material (i.e., $1 \times 10^{15}$ to $10^{17}$ counts/$cm^2$).

In a preferable embodiment of the art disclosed herein, the supplemental element comprises at least tungsten (W). According to such an embodiment, the internal resistance can be reduced more effectively. For example, an embodiment where the supplemental element comprises W, niobium (Nb) and zirconium (Zr) is preferable. According to such an embodiment, a particularly great effect of reducing the internal resistance can be obtained.

In a preferable embodiment of the art disclosed herein, the positive electrode active material comprises surface regions having a crystal structure in which 1 to 50 (003)-plane dislocations are present per 15 by 15 $nm^2$. According to a positive electrode active material comprising surface regions having a crystal structure in which a suitable amount of such lattice plane dislocations are present, can be effectively obtained a lithium secondary battery having effectively reduced internal resistance. At least part of the (003)-plane dislocations may have been generated upon ion implantation of the supplemental element.

The present invention also provides a method for producing a positive electrode active material for lithium secondary batteries. The method comprises obtaining an untreated active material primarily comprising a lithium transition metal composite oxide having a layered structure. The method further comprises ionically implanting at least one species of supplemental element among elements belonging to groups 3 to 7 of the periodic table into surface regions of the untreated active material. According to such a method, with inclusion of a positive electrode active material that is a lithium transition metal composite oxide comprising surface regions ionically implanted with a supplemental element, can be effectively produced a lithium-ion secondary battery with lower internal resistance. The method can be preferably employed as a method for producing a positive electrode active material disclosed herein for lithium secondary batteries.

In a preferable embodiment of the art disclosed herein, the ion implantation is carried out so that the surface regions have a crystal structure in which 1 to 50 (003)-plane dislocations are present per 15 by 15 $nm^2$. By this means, can be obtained a positive electrode active material comprising surface regions having a crystal structure in which a suitable amount of lattice plane dislocations are present. According to such a positive electrode active material, can be effectively obtained a lithium secondary battery with reduced internal resistance. Since the amount of (003)-plane dislocations can be controlled by taking advantage of the procedure ionically implanting the supplemental element, can be efficiently produced a positive electrode active material comprising surface regions ionically implanted with an supplemental element, with the surface regions comprising a suitable amount (an amount that preferably contributes to increase the battery performance (e.g., to reduce the internal resistance)) of lattice plane dislocations.

In a preferable embodiment, the ion implantation is carried out so that the positive electrode active material exhibits an absorbance peak at 530 eV in its XAFS spectrum of the surface regions, with the peak having an intensity of 80% to 95% expressed as a relative value to the intensity before the ion implantation. According to such an embodiment, can be effectively produced a positive electrode active material that comprises surface regions supplemented with the supplemental element and has been modified to have in a surface state suitable for reduction of the internal resistance.

The present invention provides a positive electrode active material produced by a method disclosed herein. The present invention also provides a positive electrode for a lithium secondary battery, comprising a positive electrode active material disclosed herein (which may be a positive electrode active material produced by a method disclosed herein). It further provides a lithium secondary battery comprising such a positive electrode.

As described above, the lithium secondary battery (typically, a lithium-ion secondary battery) disclosed herein may exhibit great high-rate properties since it has reduced internal resistance; and therefore, it is preferable as a power supply to be used in vehicles. In another aspect, the present invention provides, for example, as shown in FIG. 4, a vehicle 1 comprising a lithium secondary battery 100 disclosed herein (which may be a battery system comprising multiple batteries connected linearly in typical). In particular, a vehicle (automobile) comprising such a lithium secondary battery as a driving power supply (typically, a driving power supply in a hybrid vehicle or an electric vehicle) is preferable. The present invention also provides a lithium secondary battery 100 for a vehicle-driving power source.

EMBODIMENTS OF INVENTION

Figure 1:
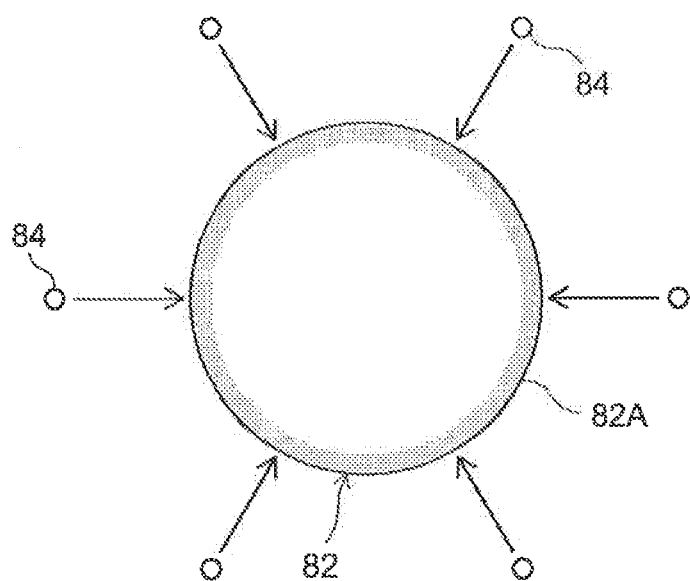
FIG. 1 shows a schematic diagram illustrating a positive electrode active material comprising surface regions ionically implanted with a supplemental element.

Preferred embodiments of the present invention are described below. Matters necessary to practice this invention other than those specifically referred to in this description may be understood as design matters based on the conventional art in the pertinent field to a person of ordinary skills in the art. The present invention can be practiced based on the contents disclosed in this description and common technical knowledge in the subject field. In the drawings referenced below, members and sites providing the same effect may be indicated by a common reference numeral, and redundant descriptions may be omitted or simplified.

The positive electrode active material in the art disclosed herein is a material capable of reversely storing and releasing lithium ($Li^+$), which acts as a charge carrier in a lithium secondary battery. The positive electrode active material is a lithium transition metal composite oxide (an untreated positive electrode active material) having a layered structure, with the oxide comprising surface regions supplemented (in typical, ionically implanted) with an element belonging to groups 3 to 7 of the periodic table.

Herein, the term "lithium transition metal composite oxide having a layered structure" refers to an oxide comprising one, two or more transition metals and having a layered (typically a rock salt-type) structure. As the lithium transition metal composite oxide, can be preferably used an oxide that is present in a form of secondary particles assembled from primary particles. For example, a usable oxide has an average secondary particle diameter of about 1 µm to 50 µm. It is usually preferable to use an oxide having an average secondary particle diameter of about 2 µm to 20 µm (typically 3 µm to 10 µm, e.g., about 3 µm to 8 µm, or possibly 5 µm to 10 µm). In the present description, unless otherwise specified, the "average particle diameter" refers to a median diameter (D50:50th volume percentile average particle diameter) determined from a size distribution measured using a particle counter based on the laser scattering/diffraction method.

Such a lithium transition metal composite oxide comprises particle surface regions supplemented with an element (supplemental element) belonging to groups 3 to 7 of the periodic table has been added. With the presence of such a supplemental element in surface regions, the internal resistance of the lithium secondary battery can be preferably reduced. In other words, the supplemental element is placed intensively (heavily) in the particle surface region, and thus, it is possible to effectively modify the particle surface with a smaller amount of a supplemental element and produce a great internal resistance reduction effect. As compared to an embodiment where the supplemental element is contained at an approximately constant concentration throughout surface regions and particle cores (bulk), the supplemental element is less likely to have disadvantageous influence on the other properties. Thus, a higher performance battery can be obtained. Furthermore, because it allows reduction of the amount of the supplemental element necessary to obtain a desirable internal resistance reduction effect, it is also advantageous in terms of the raw material cost.

The supplemental element may be one, two or more species selected from, for instance, W, Zr, Nb, Mo, Ti, V, Cr, Mn, La, and Ce. From the standpoint of obtaining a greater internal resistance reduction effect, it is preferable that at least one species of supplemental element is an element belonging to groups 4 to 6 of the periodic table. From the same standpoint, it is preferable that at least one species of supplemental element is an element belonging to the fifth period or a later period (typically the filth period or the sixth period). As such, it is advantageous to use an element (e.g., W) having a large atomic weight as at least one species of supplemental element, also in view that when the element is supplemented by ion implantation described later, a suitable amount of lattice plane dislocations can be easily incorporated along with the ion implantation.

In a preferable embodiment of the art disclosed herein, the supplemental element comprises at least W. The supplemental element may be W solely or a combination of two or more elements including W. For example, can be preferably used a combination of W and Zr, a combination of W and Nb, a combination of W, Zr and Nb, and the like. Among these, the combination of W, Zr and Nb is preferable. According to such a combination, it is possible to obtain an especially great internal resistance reduction effect. When two or more different elements are supplemented, their supplementation ratio is not particularly limited. For example, when the supplemental element consists of two species, the ratio of their amounts supplemented (based on the number of atoms; the same applies hereinafter) can be 1:2 to 2:1. When the supplemental element consists of three species, the amount of each element to be supplemented can be selected so as to be greater than zero, but 0.7 or smaller (typically 0.5 or smaller) (e.g., so that the amount of three elements are about the same (equimolar)) with the total of their amounts being 1.

In a preferable embodiment, the untreated positive electrode active material (a positive electrode active material not yet supplemented with a supplemental element) is a compound represented by general formula $Li_xMO_2$. In the general formula, M represents one, two or more metals among which at least one species is a transition metal. The transition metal typically comprises one, two or more species among Ni, Co and Mn. In the general formula, x is a real number that satisfies $0<x<1.3$. In the general formula, x may vary depending on the state of charge (SOC) of the battery. As for the composition of the positive electrode active material at the time of constructing a battery (i.e., the composition of the positive electrode active material used for producing a battery), x in the general formula is preferably 0.7 or larger, but smaller than 1.3 (e.g., 0.9 or larger, but 1.2 or smaller). In usual, this composition is approximately the same as the composition of the battery when it is fully discharged. The composition is approximately the same also as the composition of the particle core (bulk) in the positive electrode active material comprising surface regions supplemented with the supplemental element.

A preferable example of the lithium transition metal composite oxide in the art disclosed herein is an oxide in which M of the general formula comprises at least Li, Ni, Co and Mn (i.e., a LiNiCoMn oxide). For example, in a preferable LNiCoMn oxide, with the total amount of Ni, Co and Mn being 1, each of Ni, Co and Mn is greater than zero, but 0.7 or smaller. The primary element (the element with the largest molar content) among Ni, Co and Mn can be any of Ni, Co and Mn. In a preferable embodiment, the primary element is Ni. In another preferable embodiment, Ni, Co and Mn are approximately equimolar. Examples include compounds represented by general formula $Li_xNi_{1/3}Mn_{1/3}Co_{1/3}O_2$ (x is a real number that satisfies $0<x<1.3$, or preferably meets $0.7 \le x<1.3$ at a fully discharged state). Such three-element-based lithium transition metal composite oxide is preferable since it produces excellent thermal stability as a positive electrode active material.

In the general formula, in addition to at least one species among Ni, Co and Mn, M may further comprise other metal(s). Examples of such metals include Al, Fe, Cu, Zn, Ga, Ca, Mg, In, Sn, W, Zr, Nb, Mo, Ti, V, Cr, La, Ce and the like. While the supplemental element described above can be contained throughout particles as a basic component of the positive electrode active material (i.e., it is included in M), it can be also supplemented (in typical, ionically implanted) additionally to surface regions of the particles. In this case also, by making the concentration (the frequency of existence) of the supplemental element in particle surface regions higher than that of particle interiors, while suppressing the influence on the other properties, the effect of reducing the internal resistance can be preferably produced.

The untreated active material in the art disclosed herein may be produced by various methods. For example, some starting compounds suitably selected in accordance with the atomic composition (metal species and their atomic ratio) of the untreated active material are mixed at a prescribed molar ratio and calcined by a suitable means. Alternatively, from an aqueous solution containing some starting compounds suitably selected in accordance with the atomic composition (metal species other than Li and their atomic ratio) of the untreated active material, a hydroxide corresponding to the atomic composition may be prepared (by co-precipitation), and the hydroxide and a suitable Li source (lithium carbonate, lithium hydroxide, etc.) may be mixed and calcined. By pulverizing the lithium transition metal composite oxide obtained via such calcination by a suitable means and adjusting the particle diameter (e.g. by sifting) as necessary, can be obtained a particulate lithium transition metal composite oxide (untreated active material) consisting essentially of secondary particles having a desirable average particle diameter.

In the art disclosed herein, as a method for supplementing a supplemental element to an untreated active material, can be preferably employed a method where the supplemental element is ionically implanted. By such ion implantation, as schematically shown in FIG. 1, an active material particle 82 can be bombarded with ions 84 as the supplemental element to obtain a positive electrode active material 30 wherein the particle 82 comprises a surface region 82A supplemented intensively with the supplemental element.

The ion implantation can be carried out by using a general ion implantation system. In typical, an ion implantation treatment is carried out by placing an untreated active material (target) to be treated into a chamber of an ion implantation system. At this time, the untreated active material can be placed on the negative electrode side of the chamber. This allows suitable bombardment of the untreated active material with ions of a supplemental element of interest. The degree of vacuum inside the chamber can be preferably adjusted to $1.0 \times 10^{-5}$ Pa or below (typically $0.1 \times 10^{-5}$ Pa to $1.0 \times 10^{-5}$ Pa). For this, it is preferable to reduce the pressure after filling the chamber once with a dry inert gas (dry $N_2$ gas, etc.).

The accelerating voltage during the ion implantation is suitably about 0.1 keV to 5 keV. When the accelerating voltage is excessively high, the supplemental element may be implanted too deeply, making it hard to concentrate the surface regions with the supplemental element. In view of the balance with the efficiency of ion implantation, can be preferably employed an accelerating voltage of, for instance, about 0.5 keV to 5 keV (e.g., 1 keV to 3 keV). Preferable results can be obtained by selecting the settings (degree of vacuum, accelerating voltage, etc.) for ion implantation so that the supplemental element has an average implantation depth of approximately 1 nm to 10 nm (e.g. 1 nm to 5 nm) from the particle surface. For example, it is possible to obtain a positive electrode active material suited for constructing a lithium secondary battery having low internal resistance while excelling in other battery properties. The implantation depth can be determined, for instance, by X-ray photoelectron spectroscopy (XPS). The art disclosed herein can be practiced preferably in an embodiment where, when the relationship between the concentration of the supplemental element implanted by the ion implantation and the depth thereof from the active material particle surface (min other words, the depth distribution of the supplemental element) is analyzed by XPS, the concentration maximizes when the depth is approximately 1 nm to 10 nm (e.g. 1 nm to 5 nm) from the particle surface.

The time length of the ion implantation treatment is not particularly limited. It can be suitably selected so that a desirable amount of ions are implanted per area over which the target is in place (per area treated with the ion implantation system) or per particle surface area of the untreated active material. From the standpoint of the productivity, the time length of ion implantation can be about 0.1 minute to 5 minutes. The ion implantation amount per area over which the target is in place can be, for instance, about $1 \times 10^{10}$ ions/cm$^2$ to $1 \times 10^{20}$ ions/cm$^2$, and it is usually suitable to be about $1 \times 10^{15}$ ions/cm$^2$ to $1 \times 10^{17}$ ions/cm$^2$ (e.g. $1 \times 10^{16}$ ions/cm$^2$ to $5 \times 10^{16}$ ions/cm$^2$). The ion implantation amount per particle surface area of the untreated active material can be, for instance, about $1 \times 10^{10}$ ions/cm$^2$ to $1 \times 10^{20}$ ions/cm$^2$, and it is usually suitable to be about $1 \times 10^{14}$ ions/cm$^2$ to $1 \times 10^{18}$ ions/cm$^2$. With such an implantation amount, the effect obtainable by applying the present invention can be produced to a greater extent. When the ion implantation amount is too low, the internal resistance reduction effect tends to be poorer. When it is excessive, it may have measurable influences on the other battery properties. The ion implantation amount per area over which the target is in place can be determined, for instance, by using a silicon wafer as the target in place of the untreated active material and calibrating by the ion implantation amount determined by analysis of the silicon wafer.

When multiple species of supplemental element are ionically implanted, the order of their implantation is not particularly limited. In usual, it is suitable to be in descending order of atomic weight. For instance, when three elements, namely W, Zr and Nb, are ionically implanted, it can be in the order of W, Nb and Zr.

In a preferable embodiment of the positive electrode active material in the art disclosed herein, it is preferable that the active material comprises (003)-plane dislocations present at a suitable frequency in the crystal structures of its surface regions. The (003)-plane dislocations are described in detail below with reference to FIG. 9 and FIG. 10.

Figure 10:
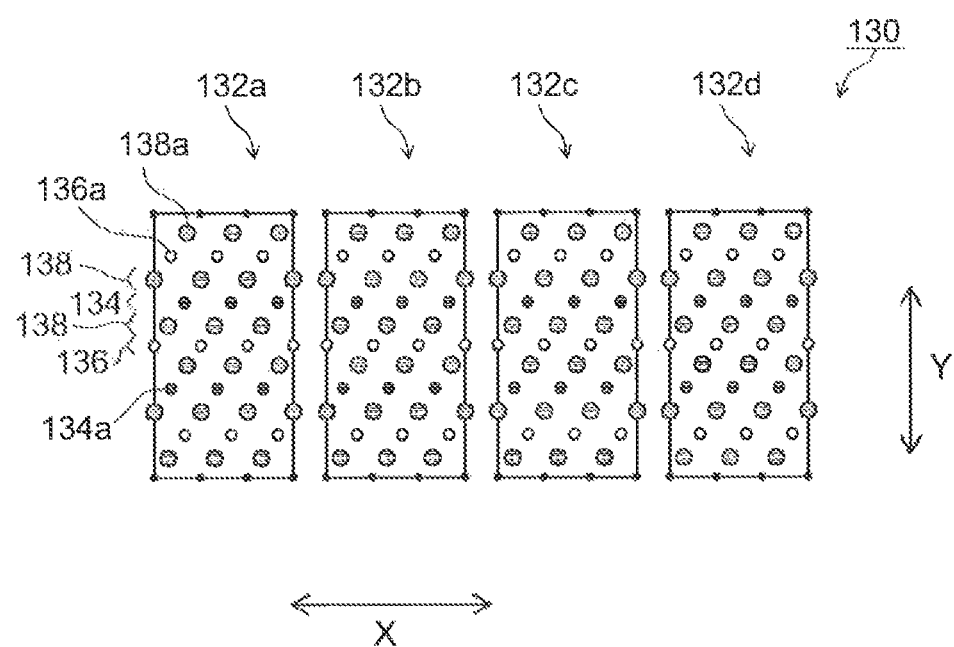
FIG. 10 shows a diagram schematically illustrating a crystal structure of a positive electrode active material consisting of a typical lithium transition metal composite oxide having a layered structure.

FIG. 10 shows a diagram schematically illustrating a crystal structure of a general positive electrode active material consisting of a lithium transition metal composite oxide having a layered structure. In FIG. 10, to facilitate understanding of the invention, the crystal structure of the positive electrode active material is drawn two-dimensionally while it actually has a three-dimensional structure such as a hexahedron, etc., and similar layer structures are formed in the depth direction of the drawing. In the following description, for convenience, the horizontal direction in FIG. 10 is defined as the X direction, and the vertical direction is defined as the Y direction. As shown in the drawing, a positive electrode active material 130 is constituted with multiple unit crystals 132a to 132d. In these unit crystals 132a to 132d, Li layers 134 and metal layers 136 are stacked alternately in a certain direction (Y direction) while oxygen layers 138 are present between each Li layer 134 and metal layer 136. Li layer 134 is constituted with multiple lithium atoms 134a placed sequentially in a certain direction (X direction) while metal layer 136 is constituted with multiple transition metal atoms 136a placed sequentially in the prescribed direction (X direction). Oxygen layer 138 is constituted with multiple oxygen atoms 138a placed sequentially in the prescribed direction (X direction). In such unit crystals 132a to 132d, lithium conducting paths are formed along the direction (X direction) in which lithium atoms 134a are placed. In other words, in the positive electrode active material 130 having such a crystal structure, lithium migrates mainly along two-dimensional conducting paths (two-dimensional conducting paths that expand in the X direction in FIG. 10 and in the depth direction of the drawing).

Figure 9:
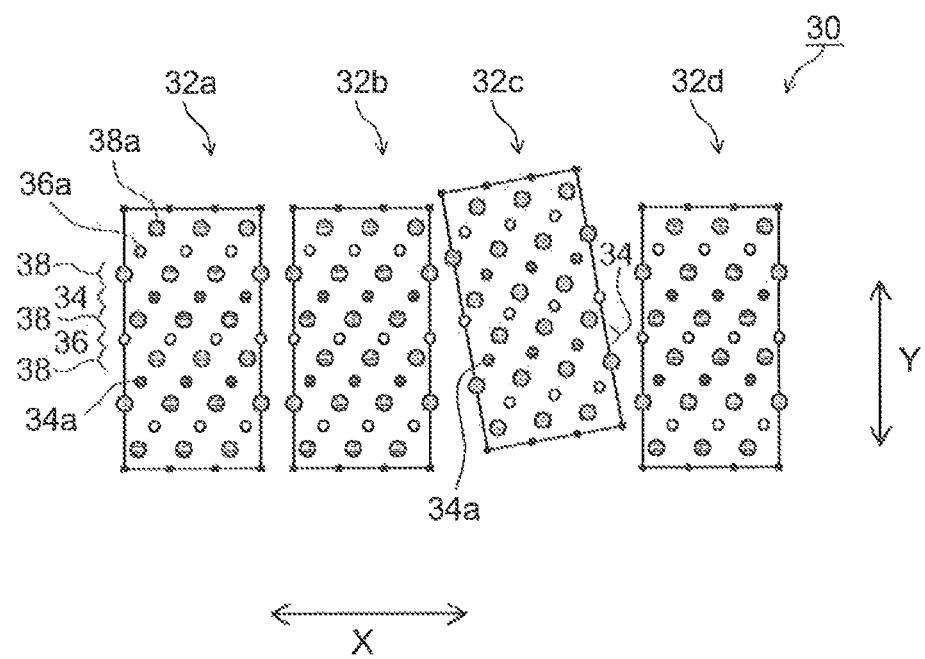
FIG. 9 shows a diagram schematically illustrating a crystal structure of a positive electrode active material according to an embodiment.

On the other hand, in the positive electrode active material in the art disclosed herein, as schematically shown in FIG. 9, a dislocation is present on the (003) plane of positive electrode active material 30. The term "(003) plane" herein refers to a lattice plane specified by a so-called Miller index. In the location where the (003)-plane dislocation is present, the crystal structure of positive electrode active material 30 is deformed, giving rise to a dislocation in the outermost surface of positive electrode active material 30. In other words, at a location where a (003)-plane dislocation is present, similarly to a unit crystal 32c in FIG. 9, a certain unit crystal is tilted relative to other unit crystals, and thus, the orientation of lithium atoms 34a constituting Li layers 34 in the unit crystal 32c is tilted relative to the X direction. Consequently, at the location (around the unit crystal 32c in FIG. 9) where the (003)-plane dislocation is present, there are formed lithium-conducting paths directed not only in the X direction, but also in the Y direction (some sorts of three-dimensional lithium-conducting paths). A positive electrode active material comprising such a surface structure (surface crystal structure) may have lower internal resistance as compared to a conventional positive electrode active material relying mostly on two-dimensional lithium-conducting paths. Thus, according to such a positive electrode active material, it is possible to obtain a lithium secondary battery having lower internal resistance.

In a preferable embodiment of the art disclosed herein, the frequency of (003)-plane dislocations is about 1 to 50 locations (preferably 20 locations or fewer, more preferably 2 to 20 locations, typically about 5 to 15 locations, e.g., about 10 locations) per 15 by 15 nm$^2$ of crystal lattice plane appeared on the particle surface. When the number of dislocations is too many, the crystal structure of the lithium transition metal composite oxide may be greatly altered (e.g., it may turn amorphous), and thus, lithium ion intercalation or de-intercalation may become difficult to achieve at the positive electrode active material. The frequency of dislocations can be determined by observing the positive electrode active material surface by transmission electron microscopy (TEM) and counting the number of (003)-plane dislocations present within a square region of 15 nm on a side arbitrarily (randomly) selected within the viewing field. It is preferable to count the number of dislocations with respect to at least two regions (typically 2 to 10 regions, e.g., 3 to 5 regions) and use their arithmetic mean value as the frequency of (003)-plane dislocations in the positive electrode active material.

In the positive electrode active material disclosed herein, when the supplemental element is supplemented by ion implantation, part of (003)-plane dislocations can be formed by taking advantage of the ion implantation. In particular, when particle surfaces of a target (untreated active material) are bombarded with an ionized supplemental element, physical impacts are applied regionally to the surfaces. In the regions that received the impacts, unit crystals may be tilted, giving rise to regional dislocations on the (003) plane of the positive electrode active material. This allows the positive electrode active material to maintain the crystal structure at large while a suitable amount of (003)-plane dislocations can be incorporated in surface regions of the positive electrode active material.

The frequency of (003)-plane dislocations arising upon ion implantation of a supplemental element may vary depending on the type (atomic weight, etc.) of supplemental element, accelerating voltage, degree of vacuum, ion implantation amount and so on. Thus, by modifying these conditions, the frequency of (003)-plane dislocations in the resulting positive electrode active material can be easily changed. In addition to dislocations incorporated upon ion implantation of a supplemental element, the frequency of dislocations can be adjusted (increased) by sputtering (plasma sputtering, ion beam sputtering, etc.) with an inert gas. According to this method, the ion implantation amount and the accelerating voltage of the supplemental element are unlikely to be limited by the amount of dislocations incorporated therein, and a positive electrode active material can be produced efficiently by forming at least part of dislocations by means of ion implantation of the supplemental element. As the inert gas, gases such as Ar, He, Ne, Kr, Xe, $N_2$ and the like can be used. For instance, Ar gas can be preferably used.

In the positive electrode active material disclosed herein, it is preferable that the supplemental element is supplemented to the surface regions in an amount that gives rise to an absorbance peak at 530 eV in its XAFS spectrum having an intensity $I_A$ of 80% to 95% i.e., $I_A/I_0$ is 80% to 95%) expressed as a relative value to the absorbance intensity $I_0$ of the corresponding material not supplemented with the element (e.g., with respect to a positive electrode active material obtainable by ionically implanting a supplemental element into an untreated active material as described earlier, the intensity of the absorbance peak at 530 eV in the XAFS spectrum of the untreated active material). With the amount satisfying such an $I_A/I_0$ ratio, the effect obtainable by application of the present invention can be produced to a greater extent Too large an $I_A/I_0$ ratio value may lead to a poorer internal resistance reduction effect. Too small an $I_A/I_0$ ratio value may have measurable influence on the other properties. In a preferable embodiment, $I_A/I_0$ is 82% to 90% (e.g., 83% to 87%). It is noted that the term "intensity of an absorbance peak at 530 eV" refers to the difference between the top (peak top) of the absorbance that appears around 530 eV and the absorbance intensity preceding the absorption (i.e., a pseudo-plateau present before the absorbance peak; usually, on the lower energy side, shifted by about 3 eV to 5 eV from the peak top) (see FIG. 7). The position of the peak top is typically in a range of 527 eV to 533 eV. The "intensity of an absorbance peak at 530 eV" may reflect the conditions such as the activity, etc., of oxygen atoms in the active material besides the crystallinity of the active material surface.

In an embodiment of the art disclosed herein, as a preferable example of a method for supplementing a supplemental element to surface regions of a positive electrode active material so as to satisfy the $I_A/I_0$ ratio value, can be cited, as described earlier, a method where the supplemental element is ionically implanted into an untreated active material. Other methods include a method where the oxide of the supplemental element is added to particles of the untreated active material and mixed with a ball mill or the like (which may be understood as a mechanochemical method). In view of distributing the supplemental element highly intensively in the particle surfaces, the ion implantation method can be preferably employed.

The art disclosed herein is characterized by using, as a positive electrode active material, a lithium transition metal composite oxide comprising surface regions supplemented with a prescribed supplemental element. Thus, as long as an objective of the present invention is achieved, the materials or the shapes, etc., of the other battery components are not particularly limited, and anything similar to those used in conventional lithium secondary batteries (typically lithium-ion secondary batteries) can be used. Preferable applications of the positive electrode active material include a positive electrode having a constitution comprising a current collector bearing a positive electrode material mixture that comprises the positive electrode active material as a primary component (i.e., a component accounting for 50% by mass or greater, typically a component accounting for 75% by mass or greater), and a lithium secondary battery comprising the said positive electrode.

As for the material constituting the current collector (positive current collector), similarly to conventional general lithium secondary batteries, a conductive metal material such as aluminum, etc., can be preferably used. The shape of the positive current collector is not particularly limited as it may vary in accordance with the shape, etc., of the battery constituted with the positive electrode, and it may have various shapes such as a rod, plate, sheet, foil, mesh, and so on. The art disclosed herein can be preferably applied to a positive electrode for a lithium secondary battery in which a positive electrode material mixture layer is provided on top of a current collector sheet or foil, and also to a lithium secondary battery comprising the positive electrode as a component. As a preferable embodiment of such a lithium secondary battery, can be cited a battery having a constitution where an electrode body (wound electrode body) is placed along with a suitable non-aqueous electrolyte (typically an electrolyte in a liquid phase, i.e., an electrolyte solution) in an outer case, with the electrode body being obtainable by winding a positive electrode sheet and a negative electrode sheet typically along with separator sheets. The outer shape of the battery is not particularly limited, and it may be in a form of, for instance, a cuboid, cylinder, or coin, etc.

The positive electrode material mixture may comprise a positive electrode active material (typically as particles) disclosed herein as well as optional components such as a conductive material, binder, etc., as necessary. As the conductive material, can be suitably selected a material similar to conductive materials used in positive electrodes in general lithium secondary batteries, and the like. Examples of such a conductive material include carbon materials such as carbon powder, carbon fibers, etc., and conductive metal powders such as nickel powder, etc. As the carbon powder, can be preferably used carbon blacks such as acetylene black, furnace black and the like. Among these conductive materials, can be used one species solely or a suitable combination of two or more species. Examples of the binder include carboxymethyl cellulose (CMC), polyvinyl alcohol (PVA), polytetrafluoroethylene (PTFE), styrene-butadiene block copolymers (SBR), polyvinylidene fluoride (PVDF), and the like. Among these binders, can be used one species solely or a suitable combination of two or more species.

The ratio of the positive electrode active material to the entire positive electrode material mixture is preferably about 50% by mass or greater (typically 50 to 95% by mass), or it is usually preferable to be about 70 to 95% by mass (e.g., 75 to 90% by mass). The ratio of the conductive material to the entire positive electrode material mixture can be, for instance, about 2 to 20% by mass, or it is usually preferable to be about 2 to 15% by mass. In a composition using a binder, the ratio of the binder to the entire positive electrode material mixture can be, for instance, about 1 to 10% by mass, or it is usually suitable to be about 2 to 5% by mass.

For the procedure to form a positive electrode material mixture layer on a positive current collector, for example, a composition of a positive electrode material mixture in a form of a dispersion containing the positive electrode active material and other optional components (conductive material, binder, etc.) in a suitable solvent is obtained (purchased, prepared, etc.), and the composition (typically a paste or slurry composition) can be provided (typically applied) to a surface of a current collector and allowed to dry. As the solvent, any of aqueous solvents and non-aqueous solvents can be used. Preferable examples of non-aqueous solvents include N-methyl-2-pyrrolidone (NMP).

The procedure to apply a composition of a positive electrode material mixture to a current collector sheet can be carried out preferably by using a suitable heretofore known coating device (slit coater, die coater, comma coater, gravure coater, etc.). After applying a suitable amount of the composition of positive electrode material mixture to a prescribed area at least on a first face (typically each face) of the current collector and allowing it to dry, by pressing the resultant in the thickness direction as necessary, a sheet of positive electrode (positive electrode sheet) in an intended form can be obtained.

Figure 2:
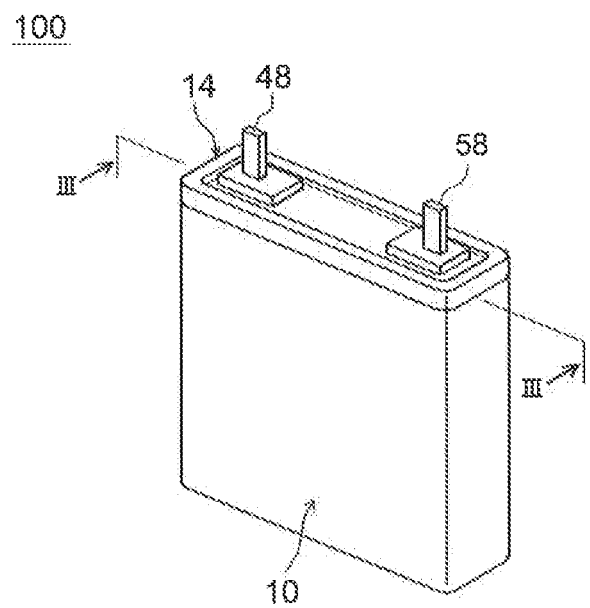
FIG. 2 shows a perspective view schematically illustrating a constitution of a lithium secondary battery.
Figure 3:
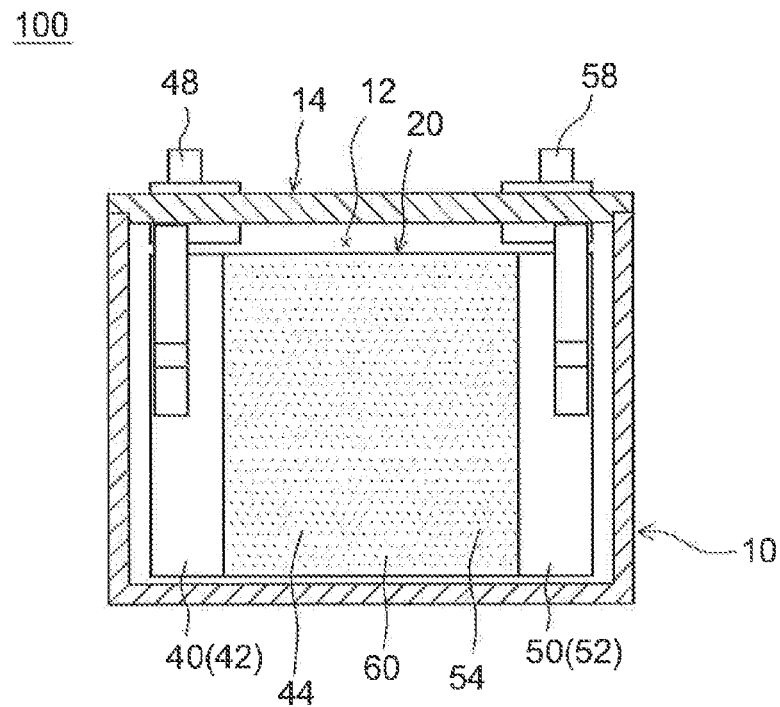
FIG. 3 shows a cross-sectional view taken along line III-III in FIG. 2.
Figure 4:
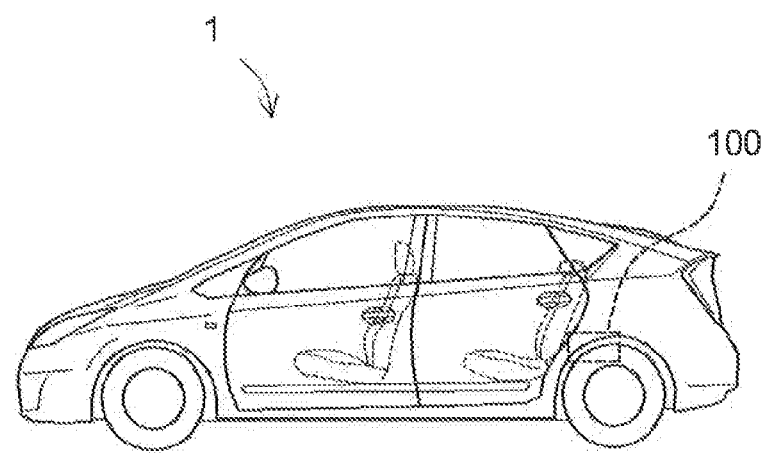
FIG. 4 shows a side view schematically illustrating a vehicle (automobile) having a lithium secondary battery.

An embodiment of a lithium-ion secondary battery comprising such a positive electrode is described below with reference to FIG. 2 and FIG. 3 although the present invention is not to be limited to such an embodiment.

A lithium-ion secondary battery 100 according to the present embodiment comprises a flat cuboidal battery case 10, a lid 14 to close an opening 12 of the case 10, a flat-shaped electrode body (wound electrode body 20) placed inside battery case 10, and an electrolyte. To electrode body 20, a positive terminal 48 and a negative terminal 58 are joined for connection to the outside, with terminals 48 and 58 passing through lid 14 and partially extending to the outside of battery 100.

Wound electrode body 20 has a constitution where a sheet of positive electrode 40 comprising a positive electrode material mixture layer 44 on a surface of a long positive electrode current collector 42 and a sheet of negative electrode 50 comprising a negative electrode material mixture layer 54 on a surface of a long negative current collector 52 are overlaid via two long sheets of separator 60. As separator 60, can be preferably used a porous sheet formed of a resin (e.g., a single-layer or multi-layer porous sheet formed of a polyolefin resin such as polypropylene, polyethylene, etc.). As the negative electrode active material constituting negative electrode material mixture layer 54, a material that has been conventionally used in lithium-ion secondary batteries can be used without particular limitations. It may be a particulate carbon material (carbon particles) comprising a graphite structure (layered structure) at least partially. For example, graphite particles such as natural graphite, etc., can be preferably used. By applying a composition of a negative electrode active material mixture to negative current collector 52 and allowing it to dry, negative electrode material mixture layer 54 can be formed on a desirable area of current collector 52, with the composition being obtainable typically by mixing it with a binder (a material similar to those used for the material mixture layer on the positive electrode side can be used) and a conductive material (a material similar to those used for the material mixture layer on the positive electrode side can be used) used as necessary.

On an edge along the length direction of positive current collector 42, no positive electrode material mixture layer is formed to provide a region (a positive electrode material mixture layer-free region) where current collector 42 is exposed. Similarly, on an edge along the length direction of negative current collector 52, a negative electrode material mixture layer-free region is provided. Positive electrode 40 and negative electrode 50 are overlaid with a slight widthwise displacement to allow the material mixture layer-free regions to extend off the first and the second edges along the length direction of separator 60. Wound electrode body 20 has a flattened shape formed by winding and then laterally compressing the overlaid components. After wound electrode body 20 attached to lid 14 is placed in battery case 10, by injecting a non-aqueous electrolyte solution and sealing the inlet, lithium secondary battery 100 in the present embodiment can be constructed.

As the non-aqueous electrolyte solution, can be used a non-aqueous electrolyte solution similar to those conventionally used in lithium-ion secondary batteries without particular limitations. Such a non-aqueous electrolyte solution typically has a composition containing a supporting salt in a suitable non-aqueous solvent. As the non-aqueous solvent, can be used one, two or more species selected from, for example, propylene carbonate (PC), ethylene carbonate (EC), diethyl carbonate (DEC), dimethyl carbonate (DMC), ethyl methyl carbonate (EMC), and the like. Examples of the supporting salt include lithium compounds (lithium salts) such as $LiPF_6$, $LiBF_4$, $LiClO_4$, $LiAsF_6$, $LiCF_3SO_3$, $LiC_4F_9SO_3$, $LiN(CF_3SO_2)_2$, $LiC(CF_3SO_2)_3$, LiI and the like. The concentration of supporting salt can be at a similar level as those of non-aqueous electrolyte solutions used in conventional lithium secondary batteries, and it is not particularly limited. For example, can be preferably used a non-aqueous electrolyte solution containing a supporting salt at a concentration of about 0.5 mol/L to 1.5 mol/L.

Several worked examples relevant to the present invention are described below although the present invention is not to be limited to these specific examples.

<Preparation of Positive Electrode Active Material Samples>

(Sample 1)

As starting materials of a positive electrode active material, were mixed lithium hydroxide as a Li source, nickel nitrate as a Ni source, cobalt nitrate as a Co source and manganese nitrate as a Mn source in amounts to yield a 1:1 molar ratio (Li/$M_{all}$) for lithium to all the other constituent metals (Ni, Co, Mn) combined ($M_{all}$).

The mixture of the starting materials was then calcined. For the calcination, the temperature was gradually increased from room temperature in the air, and the mixture was heated at a prescribed initial calcination temperature for about 5 hours. Subsequently, the temperature was further increased, and the initial calcination product obtained by the initial calcination was further calcined by heating at a prescribed highest calcination temperature for about 20 hours. The resulting calcination product was allowed to cool down, and then pulverized and sifted. As such, was prepared an untreated active material (Sample 0) in a powder form having an average particle diameter of 7 μm, which was formed of a lithium transition metal composite oxide ($LiNi_{1/3}Co_{1/3}Mn_{1/3}O_2$) having a layered structure and comprising lithium, nickel, cobalt and manganese as constituents.

The resulting untreated active material was subjected to a treatment to ionically implant W as a supplemental element. In particular, to a sample container placed on the negative electrode side inside a chamber with a degree of vacuum adjusted to $1.0 \times 10^{-6}$ Pa, 0.5 g of the untreated active material powder was added, and W ions were implanted into the powder at an accelerating voltage of 2.0 keV for a treatment time of 1 minute. The amount of W ions implanted was $2 \times 10^{16}$ ions/cm² of particle surface area of the untreated active material powder. The value of the amount implanted was determined by using a silicon wafer as the target in place of the untreated active material powder and calibrating with the amount of W ions implanted determined by analysis of the silicon wafer. As such, was obtained a positive electrode active material (Sample 1) where W was ionically implanted into particle surfaces of the lithium nickel cobalt manganese composite oxide.

(Sample 2)

The resulting untreated active material was subjected to a treatment to ionically implant three elements, namely W, Nb and Zr, as the supplemental element. In particular, similarly to the preparation of Sample 1, in a chamber at a degree of vacuum of $1.0 \times 10^{-6}$ Pa, at an accelerating voltage of 2.0 keV, W ions, Nb ions and Zr ions were implanted in this order into 0.5 g of the untreated active material powder. The time length for implantation of each ionic species was adjusted so that the total implantation amount of these ions turned out to be $3 \times 10^{16}$ ions/cm² of particle surface area while the implantation amount of each ionic species were about the same (i.e., the implantation amount of each ionic species was $1 \times 10^{16}$ ions/cm²). By this means, was obtained a positive electrode active material (Sample 2) where W, Nb and Zr were ionically implanted into particle surfaces of the lithium nickel cobalt manganese composite oxide.

(Sample 3)

A mixed solution containing nickel sulfate, cobalt sulfate, manganese sulfate and zirconium sulfate dissolved in water was prepared. From this solution, was obtained a nickel cobalt manganese composite hydroxide containing equimolar amounts of Ni, Co and Mn as well as 0.5 molar % of Zr relative to the total number of moles of these three elements (co-precipitation method). Lithium carbonate as a Li source and the composite hydroxide were mixed together so that the ratio of the number of moles of Li to the total number of moles of the three elements (Ni, Co, Mn) was 1:1. This mixture was calcined in the air at a highest calcination temperature of 850° C. for about 20 hours. The resulting calcination product was allowed to cool down, and then pulverized and sifted. As such, was prepared a positive electrode active material (Sample 3) in a powder form having an average particle diameter of 7 μm and consisting of a lithium nickel cobalt manganese composite oxide containing Zr supplemented by the co-precipitation method.

<Counting the Number of (003)-Plane Dislocations>

Figure 5:
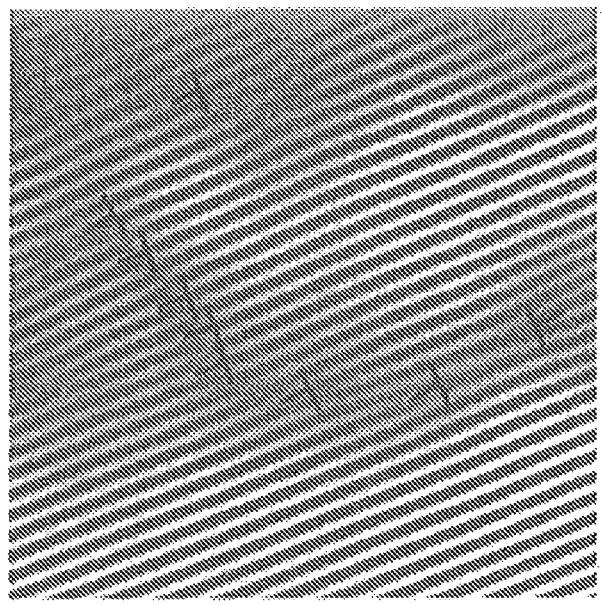
FIG. 5 shows a TEM image showing (003)-plane dislocations in a first region of sample 1.

Particle surfaces ((003) planes) of the active material sample 1 prepared above were observed by TEM. While under the TEM observation, three square regions of 15 nm on a side were randomly selected, and the number of dislocations on (003) planes (outermost surfaces) present within each region was visually counted. From the results, there were found 9 in the first region, 10 in the second region and 9 in the third region; and their arithmetic mean value (i.e., the average number of (003)-plane dislocations present per 15 by 15 nm² of surface area of sample 1) turned out to be 9. The TEM image of the first region of Sample 1 is shown in FIG. 5. In FIG. 5, each location where a (003)-plane dislocation is present is labeled with letter 'T'.

Figure 6:
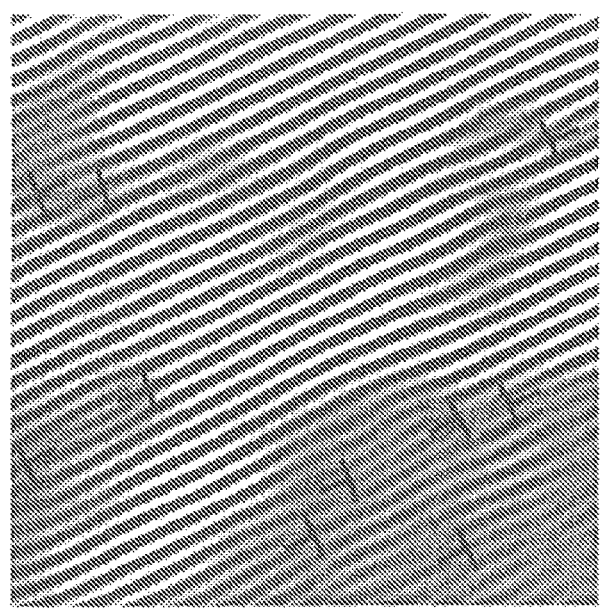
FIG. 6 shows a TEM image showing (003)-plane dislocations in a first region of sample 2.

Three regions were selected similarly with respect to the active material sample 2 and the number of (003)-plane dislocations present in each region was visually counted to find that there were 10 in the first region, 13 in the second region and 11 in the third region, and their arithmetic mean value turned out to be 11. The TEM image of the first region of sample 2 is shown in FIG. 6. As in FIG. 5, each location where a (003)-plane dislocation is present is labeled with letter "T".

<XAFS Analysis>

Figure 7:
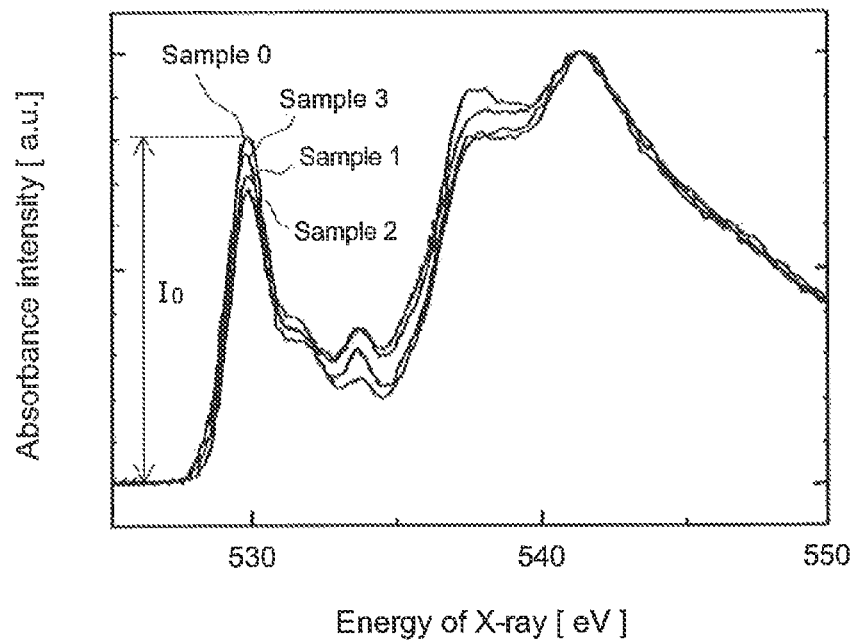
FIG. 7 shows a chart of XAFS spectra.

Each of the active material samples 0 to 3 was subjected to XAFS analysis by BL4B (a beamline equipped with a varied-line-spacing plane grating monochromator for molecular soft x-ray spectroscopy) available at UVSOR (Ultra Violet Synchrotron Orbital Radiation Facility) at Natural Institutes of Natural Sciences, Institute for Molecular Science. The chart in FIG. 7 shows overlaid XAFS spectra obtained with the respective samples. With respect to each sample, Table 1 shows the intensity $I_A$ of the absorbance peak at 530 eV in the XAFS spectrum expressed as a relative value (absorbance intensity ratio: $I_A/I_0$) with the intensity $I_0$ of sample 0 being 100%.

TABLE 1

|  | Relative intensity of absorbance (%) |
| --- | --- |
| Sample 0 | 100 |
| Sample 1 | 90 |
| Sample 2 | 84 |
| Sample 3 | 96 |

<Preparation of Lithium-Ion Secondary Batteries>

Positive electrodes for lithium-ion secondary batteries were prepared with the respective active material samples 0 to 3 as the positive electrode active material. In particular, to N-methyl-2-pyrrolidone (NMP) as a dispersion medium, were added and mixed each active material sample, polyvinylidene fluoride (PVDF) as a binder, and acetylene black as a conductive material at a mass ratio of 85:5:10 to prepare a paste for positive electrodes as a precursor material to form positive electrode material mixture layers. The paste for positive electrodes was applied to both faces of an approximately 15 μm thick positive current collector made of a long sheet of aluminum foil, and the applied layers were allowed to dry and the entirety of the resultant was pressed to form positive electrode material mixture layers on the surface (both faces) of the positive current collector. The positive electrodes for lithium-ion secondary batteries thus obtained are referred to as positive electrodes 0 to 3, respectively, corresponding to the sample numbers of the active materials used.

Using the positive electrodes 0 to 3 for the electrode, lithium-ion secondary batteries were constructed. As for the negative electrode, was used an approximately 15 μm thick negative current collector made of a long sheet of copper foil bearing on each face a negative electrode material mixture layer containing natural graphite, SBR and CMC at a mass ratio of 98:1:1. The negative electrode and the positive electrode were overlaid along with two long sheets of separator (porous polyethylene sheets were used here), and the overlaid sheets were wound in the length direction to fabricate a wound electrode body. The electrode body was placed in an outer case along with a non-aqueous electrolyte solution to construct a 18650 (18 mm diameter, 65 mm height) lithium-ion secondary battery. For the non-aqueous electrolyte solution, was used a composition containing $LiPF_6$ at a concentration of 1.0 M in a mixed solvent containing EC, DMC and EMC at a volume ratio of 3:3:4. The lithium-ion secondary batteries thus obtained are referred to as Batteries 0 to 3, respectively, corresponding to the sample numbers of the active materials used in the respective batteries.

<Alternating Current Impedance Measurement>

Figure 8:
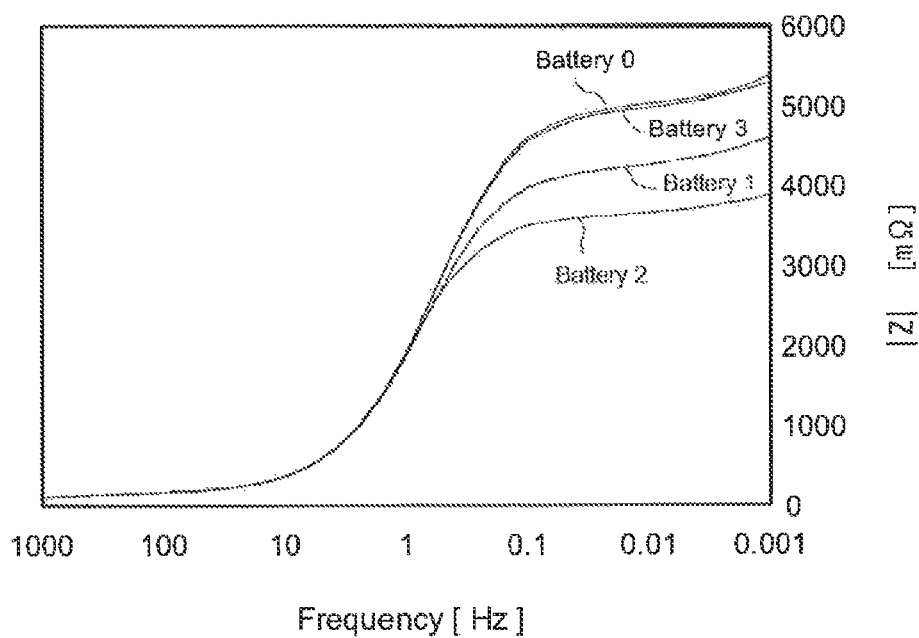
FIG. 8 shows a graph illustrating the results of an alternating current impedance measurement.

Batteries 0 to 3 were subjected to alternating current impedance measurements. In particular, each battery was adjusted to 40% SOC, and in an environment at −30° C., each battery was injected with an alternating current at a frequency from 0.001 Hz to 1000 Hz, and the absolute value of the internal resistance was measured at each frequency. The results are shown in FIG. 8 and Table 2. In the graph in FIG. 8, the horizontal axis shows the frequency (Hz) of alternating current and the vertical axis shows the absolute value ($|Z|(m\Omega)$) of internal resistance.

As shown in FIG. 8, at the high frequency range (1000 Hz to 1 Hz), no significant difference was observed in the internal resistance between Battery 0 and any of Batteries 1, 2 and 3. As it progressed into the lower frequency range (1 Hz to 0.001 Hz), it was observed that the internal resistance values of Batteries 1 and 2 tended to be significantly lower than the internal resistance of Battery 0. Especially in Battery 2, it was confirmed that a significant internal resistance reduction effect was achieved. For example, regarding the internal resistance at an alternating current frequency of 0.1 Hz, as compared to Battery 0, it was reduced by nearly 15% in Battery 1 and by nearly 25% in Battery 2. With respect to the internal resistance at an alternating current frequency of 0.001 Hz, as compared to Battery 0, the observed reduction effect was greater than 15% in Battery 1 and greater than 25% in Battery 2.

TABLE 2

|  | Internal resistance ($|Z|m\Omega$) | |
| --- | --- | --- |
|  | Alternating current frequency 0.1 Hz | Alternating current frequency 0.01 Hz |
| Battery 0 | 4550 | 5030 |
| Battery 1 | 3950 | 4250 |
| Battery 2 | 3450 | 3650 |

As shown above, with Battery 1 using as the positive electrode active material a lithium transition metal composite oxide comprising surface regions ionically implanted with W in an amount to give rise an absorbance intensity ratio $I_A/I_0$ of 90% or smaller while including dislocations on (003) planes present at a frequency of about $10/(15\ nm)^2$ (herein, $9/(15\ nm)^2$), the internal resistance was greatly reduced as compared to Battery 0 using a positive electrode active material without ionically implanted W. In Battery 2 using a positive electrode active material ionically implanted with three elements, namely W, Zr and Nb, a greater effect of internal resistance reduction was brought about.

Although the present invention have been described in detail above, the embodiments described above are merely examples, and the art disclosed herein includes various modifications and changes made to the specific examples illustrated above.

REFERENCE SIGNS LIST 1 vehicle
10 battery case
14 lid
20 electrode body (wound electrode body)
30 positive electrode active material
40 positive electrode
42 positive current collector
44 positive electrode mixture layer
48 positive terminal
50 negative electrode
60 separator
82 active material particle
82A surface region
84 supplemental element ion
100 lithium secondary battery (lithium-ion secondary battery)

The invention claimed is:

1. A lithium secondary battery comprising a positive electrode, a negative electrode, and a non-aqueous electrolyte, wherein:

the positive electrode comprises, as a positive electrode active material, a lithium transition metal composite oxide having a layered structure;

the positive electrode active material comprises surface regions supplemented via ion implantation with at least one species among elements belonging to groups 3 to 7 of the periodic table; and the surface regions of the positive electrode active material have a crystal structure in which 1 to 50 (003)-plane dislocations are present per 15 by 15 nm$^2$.

2. The lithium secondary battery according to claim 1, wherein the element supplemented to the surface regions of the positive electrode active material comprises at least tungsten.

3. The lithium secondary battery according to claim 1, wherein the element supplemented to the surface regions of the positive electrode active material comprises at least tungsten, niobium and zirconium.

4. A lithium secondary battery comprising a positive electrode, a negative electrode, and a non-aqueous electrolyte, wherein:

the positive electrode comprises, as a positive electrode active material, a lithium transition metal composite oxide having a layered structure;

the positive electrode active material comprises surface regions supplemented with at least one species among elements belonging to groups 3 to 7 of the periodic table; and the positive electrode active material exhibits an absorbance peak at 530 eV in its XAFS spectrum of the surface regions, with the peak having an intensity of 80% to 95% expressed as a relative value to the intensity of the positive electrode active material not supplemented with the element.

5. The lithium secondary battery according to claim 1, which is used as a driving power supply in a vehicle.

* * * * *